UNITED STATES PATENT OFFICE.

JAKOB SCHMID AND HERMANN REY, OF BASLE, SWITZERLAND, ASSIGNORS TO THE BADISCHE ANILIN AND SODA FABRIK, OF LUDWIGSHAFEN, GERMANY.

RED-VIOLET PHTHALEIN DYE.

SPECIFICATION forming part of Letters Patent No. 609,997, dated August 30, 1898.

Application filed December 28, 1897. Serial No. 663,898. (Specimens.) Patented in France September 3, 1896, No. 259,420, and in England September 3, 1896, No. 19,516.

*To all whom it may concern:*

Be it known that we, JAKOB SCHMID and HERMANN REY, both doctors of philosophy, chemists, citizens of the Swiss Republic, and residing at Basle, Switzerland, have invented new and useful Improvements in the Manufacture of Dyestuffs of the Phthalein Series, (which have been patented in France by Letters Patent No. 259,420, dated September 3, 1896, and in Great Britain by Letters Patent No. 19,516, dated September 3, 1896,) of which the following is a clear and complete specification.

We have found that the product resulting from the condensation of one molecule phthalic anhydrid with one molecule metaoxyphenylorthotolylamin can be applied admirably to the preparation of a sulfomonoörthotolyl-phthalein dye, which dyes wool and silk in acid-bath in fine violet-red tints, which resist the action of air and light and is very uniform on the fiber.

Every chemist who has already heated the bases of the series of metaoxydiphenylamins with phthalic anhydrid according to the United States Letters Patent No. 413,048 must have remarked that in heating progressively the mass, which in the first instance becomes fluid, thickens toward 120° to 130° centigrade and that a crystalline mass then separates, which again melts after heating to a higher temperature and forms afterward the coloring-matter. If, therefore, metaoxyphenylorthotolylamin is heated with phthalic anhydrid to 120° or 130° centigrade until the first thickening of the melted mass takes place and the latter is then exhausted by means of alcohol or any other suitable extracting agent, there will be obtained a product of condensation of phthalic anhydrid with metaoxyphenylorthotolylamin in a chemically-pure condition in the form of microscopic tablets slightly tinted a greenish yellow, while the impurities will dissolve in the alcohol or other agent employed.

The new substance which is formed of equivalent quantities of metaoxyphenylorthotolylamin and phthalic anhydrid dissolves with great difficulty in the usual organic solvents and easily in the alkalies; but it does not dissolve in dilute mineral acids. It assumes a violet color when heated to 180° centigrade and melts above 200° centigrade, decomposing completely. On melting this substance in the usual manner for the manufacture of phthalein dyes with a meta-substituted phenol—as resorcinol, monoethylmetaämidocresol dimethylmetaämidophenol, &c.—in the presence of a condensing agent the reaction takes place very readily and gives a monoorthotolyl-phthalein dye, which is distinguished by the extraordinary readiness with which it can be transformed into a sulfo-conjugated derivative, its sulfo-conjugation being effected without an energic sulfonating agent by heating it with concentrated sulfuric acid or even with sulfuric acid of eighty per cent. The sulfonated dye soluble in water thus obtained dyes wool and silk in acid-bath in fine violet-red tints which resist the action of air and light and are very uniform on the fiber.

The preparation of the new dye will be readily understood by the following examples:

Example I: 17.5 parts of the condensation product resulting from one molecule phthalic anhydrid and one molecule metaoxyphenylorthotolylamin, 5.5 parts of resorcinol, and fifteen parts of bisulfate of potash are mixed intimately and heated together in a suitable vessel to a temperature of from 170° to 175° centigrade, taking care to stir continuously. The mixture commences to melt already below 170° centigrade, takes at this temperature a metallic luster, and is completely fluid between 173° and 175° centigrade. The temperature is maintained during about one hour between the indicated limits. At the end of this time the melted mass will have become so viscous that it can hardly be stirred any longer, which indicates that the reaction has terminated. After cooling there is obtained a hard brittle glassy mass with metallic luster, which is finely pulverized and which is boiled repeatedly with water for extracting the sulfate of potash and the bisulfate which has not been decomposed. The product is then dried at 100° centigrade, and it is exhausted by means of toluene for separating the small amount of resinous impurities which it contains. The dried residue, which is formed by the sulfate of a monoörthotolyl-phthalein dye, is pulverized and constitutes a brown powder with metallic luster insoluble in water. One part of this product is dissolved in five parts of sulfuric acid of 66° Baumé at ordinary temperature. The yellowish-brown solution thus obtained is heated to 45° or 50° centigrade until a sample taken from the mass dissolves in a dilute solution of carbonate of soda without leaving it cloudy. If this point is attained, which happens at the end of a short time, the mass is run into a quantity of water equal to fifteen times the weight of the mass. The new sulfonic acid of the coloring-matter, which separates in flocculent form, is separated by filtration. It is washed with water for eliminating the greater part of the sulfuric acid, and the residue is collected by pressing or centrifugal action, is dissolved in a solution of carbonate of soda and the sodium salt of the sulfonic acid of the monoörthotolyl-phthalein dye is precipitated by common salt. This salt, after drying and pulverizing, constitutes a brilliant-brown powder readily soluble in water and sparingly soluble in alcohol, insoluble in ether and benzene. Its solution in concentrated sulfuric acid is yellow, and by addition of water to this solution the free sulfo-acid of the monoörthotolyl-phthalein dye is precipitated. It dyes wool and silk in acid-bath in red-violet tints. Its aqueous solution has a blue-red coloration with yellow cloudy fluorescence. On addition of an excess of concentrated hydrochloric acid to its aqueous solution a red-brown precipitate is formed, while on addition of an excess of a thirty-per-cent. soda-lye to its concentrated aqueous solution the color of the solution turns again to blue. An acid solution of chlorid of tin has no reducing action on the aqueous solution of the sodium salt of the sulfo-acid of the monoörthotolyl-phthalein dye, while by the action of ammonia and zinc powder at ordinary temperature this solution assumes a green-yellow color.

Example II: 17.5 parts of the condensation product from one molecule phthalic anhydrid and one molecule metaoxyphenylorthotolylamin, seven parts of dimethylmetaämidophenol, and fifteen parts of bisulfate of potash are heated together at a temperature of from 170° to 175° centigrade, it has been described in Example I, as long as the mass can be stirred—that is to say, during one hour. After cooling, the melted mass with metallic luster is pulverized and treated as described in the previous example. One part of the sulfate of dimethylmonoörthotolyl-phthalein dye thus obtained is heated with ten parts of diluted sulfuric acid of eighty to ninety per cent. during several hours on the water-bath. After having ascertained that a sample taken from the mass dissolves in alkaline water without rendering it cloudy, which is effected at the end of from four to five hours, the mass is dissolved in a large quantity of water in order to separate the sulfuric acid of the coloring-matter. This acid is transformed in the manner described in Example I into the sodium salt, which constitutes a dark-violet powder readily soluble in water, sparingly soluble in alcohol, insoluble in ether and benzene. Its solution in concentrated sulfuric acid is yellow, and by addition of water to this solution the free sulfo-acid of the monoorthotolyl-phthalein dye is precipitated. Its aqueous solution has a crimson-red coloration with weak-yellow fluorescence. On addition of an excess of concentrated hydrochloric acid to its aqueous solution a red flocculent precipitate is formed, while on addition of an excess of a thirty-per cent. soda-lye to its concentrated aqueous solution the coloration of the solution becomes bluer. An acid solution of chlorid of tin has no reducing action on the aqueous solution of the sodium salt of the sulfonated monoörthotolyl-phthalein dye, while by the action of ammonia and zinc powder at ordinary temperature this solution is decolored.

In the foregoing examples the product of condensation of phthalic anhydrid with metaoxyphenylorthotolylamin can be replaced by those resulting from the condensation of the latter with the substitution products of phthalic anhydrid obtained by substitution of the hydrogen of the nucleus of phthalic anhydrid—as, for instance, the chlorophthalic anhydrid, bromophthalic anhydrid, &c.

What we claim is—

1. The herein-described improvement in the manufacture of dyestuffs of the phthalein series, which consists in first melting equal molecular parts of phthalic anhydrid and metaoxyphenylorthotolylamin, until the molten mass thickens, and then extracting therefrom the product of condensation, substantially as set forth.

2. The improvement in the manufacture of dyestuffs of the phthalein series, which consists in condensing one molecule of the product resulting from the condensation of equivalent quantities of phthalic anhydrid and metaoxyphenylorthotolylamin, with one molecule of a meta-substituted phenol, such as specified.

3. The improvement in the manufacture of dyestuffs of the phthalein series, which consists in condensing one molecule of the product resulting from the condensation of equivalent quantities of phthalic anhydrid and metaoxyphenylorthotolylamin, with one molecule of a meta-substituted phenol, such as specified, then converting the monoörthotolyl-phthalein dye thus obtained into a sulfo-acid by treating it with sulfuric acid and finally converting the sulfo-acid thus obtained in an alkaline salt, as described.

4. As a new article of manufacture the herein-described dyestuff, which forms the alkaline sulfonate of a monoörthotolyl-phthalein dye and which dyes wool and silk in acid-bath in fine red-violet tints, dissolves in water with a blue-red color and a yellowish fluorescence, is sparingly soluble in alcohol, insoluble in ether and benzene, dissolves in concentrated sulfuric acid with yellow coloration and may be precipitated from its solution in concentrated sulfuric acid, by an addition of water, in the form of free sulfo-acid.

In witness whereof we have hereunto signed our names in the presence of two subscribing witnesses.

JAKOB SCHMID.
HERMANN REY.

Witnesses:
GEORGE GIFFORD,
AMAND RITTER.